United States Patent
Ptak et al.

(10) Patent No.: US 9,921,914 B2
(45) Date of Patent: Mar. 20, 2018

(54) REDUNDANT ARRAY OF INDEPENDENT DISKS (RAID) WRITE HOLE SOLUTIONS

(71) Applicant: Intel Corporation, Santa Clara, CA (US)

(72) Inventors: Slawomir Ptak, Gdnask (PL); Sanjeev N Trika, Portland, OR (US); Piotr Wysocki, Gdansk (PL); Kapil Karkra, Chandler, AZ (US); Rajib Ghosal, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 14/931,730

(22) Filed: Nov. 3, 2015

(65) Prior Publication Data

US 2017/0123921 A1     May 4, 2017

(51) Int. Cl.
| | |
|---|---|
| *G06F 11/00* | (2006.01) |
| *G06F 11/10* | (2006.01) |
| *G06F 3/06* | (2006.01) |

(52) U.S. Cl.
CPC .......... *G06F 11/1096* (2013.01); *G06F 3/064* (2013.01); *G06F 3/0619* (2013.01); *G06F 3/0689* (2013.01)

(58) Field of Classification Search
CPC .................................................. G06F 11/1096
USPC ................... 714/6.24, 6.2, 6.22, 6.23, 11–13
See application file for complete search history.

(56) References Cited

U.S. PATENT DOCUMENTS

| | | | | |
|---|---|---|---|---|
| 5,155,835 A | * | 10/1992 | Belsan | G06F 3/0601 |
| | | | | 711/113 |
| 5,274,807 A | * | 12/1993 | Hoshen | G06F 3/0601 |
| 5,774,643 A | | 6/1998 | Lubbers et al. | |
| 7,308,599 B2 | * | 12/2007 | Patterson | G06F 11/1092 |
| | | | | 711/114 |
| 7,636,814 B1 | | 12/2009 | Karr et al. | |
| 7,779,294 B2 | | 8/2010 | Corrado et al. | |
| 8,443,153 B1 | | 5/2013 | Edwards et al. | |
| 9,141,299 B2 | | 9/2015 | Grimsrud et al. | |

(Continued)

FOREIGN PATENT DOCUMENTS

WO     2012/142027 A2     10/2012

OTHER PUBLICATIONS

Morgan, Timothy P., "Intel Shows Off 3D XPoint Memory Performance," The Platform, pp. 1-5, accessed at http://www.theplatform.net/2015/10/28/intel-shows-off-3d-xpoint-memory-performance/ on Oct. 29, 2015.

(Continued)

*Primary Examiner* — Dieu-Minh Le
(74) *Attorney, Agent, or Firm* — Lowenstein Sandler LLP

(57) ABSTRACT

An apparatus includes a plurality of drives configured as a redundant array of independent disks (RAID) and drive array controller logic to: calculate a first partial parity log (PPL) value for a first write operation that targets a first active stripe of the plurality of drives; store the first PPL value in a first pre-allocated portion of the plurality of drives that depends on a first number associated with the first active stripe; calculate a second PPL value for a second write operation that targets a second active stripe of the plurality of drives; and store the second PPL value in a second pre-allocated portion of the plurality of drives that depends on a second number associated with the second active stripe.

25 Claims, 12 Drawing Sheets

(56) References Cited

U.S. PATENT DOCUMENTS

| | | | |
|---|---|---|---|
| 9,274,720 B1 | 3/2016 | Ori | |
| 9,348,758 B2* | 5/2016 | Pignatelli | G06F 12/1009 |
| 9,471,448 B2 | 10/2016 | Williams et al. | |
| 9,489,150 B2* | 11/2016 | Aszmann | G06F 3/0689 |
| 2002/0091903 A1 | 7/2002 | Mizuno | |
| 2002/0161970 A1 | 10/2002 | Busser | |
| 2003/0196052 A1 | 10/2003 | Bolik et al. | |
| 2010/0114847 A1 | 5/2010 | Giampaolo et al. | |
| 2013/0332655 A1 | 12/2013 | Kandiraju et al. | |
| 2014/0325262 A1* | 10/2014 | Cooper | G06F 11/1092 714/6.22 |

OTHER PUBLICATIONS

Lawson, Stephen, "Intel, Micron Claim a New Class of Memory between Flash and DRAM," CIO, pp. 1-4, accessed at http://www.cio.com/article/2953153/intel-micron-claim-a-new-class-of-memory-between-flash-and-dram.html on Aug. 27, 2015.

Halfacree, Gareth, "Intel Pledges 2016 Launch for 3D XPoint-Based Optane," 2pgs, accessed at http://www.bit-tech.net/news/hardware/2015/08/19/intel-optane/1/ on Aug. 27, 2015.

"Intel Solid-State Drives in Server Storage Applications," White Paper, pp. 1-24 (Feb. 2014).

International Search Report and Written Opinion for International Application No. PCT/US2015/060478, 14 pages, dated Mar. 31, 2016.

Avago Technologies, "Storage Solutions Product Guide," Avago Technologies, 12 pages, 2013-2014.

Bonwick, J., "Raid-Z," https://blogs.oracle.com/bonwick/entry/raid_Z, 5 pages, Nov. 17, 2005, Retrieved on Nov. 9, 2014.

"Closing the RAID5 Write Hole," http://neil.brown.name/blog/20110614101708, 9 pages, Jun. 14, 2011, Retrieved on Dec. 10, 2014.

LSI Corporation, "LSI Product Brief," by LSI Corporation, 2 pages, 2013.

Rodeh, O., "B-Trees, Shadowing, and Clones," IBM Haifa Research Labs, ACM Transactions on Computational Logic, vol. V, No. N, 26 pages, Aug. 2007.

Rodeh O., "B-Trees, Shadowing, and Clones," 51 pages, Feb. 2008.

Sanapptx, "Raid-Z," http://sanapptx.com/resources/why-zfs/raid-z/>, 1 page, 2014.

* cited by examiner

REDUNDANT ARRAY OF INDEPENDENT DISKS (RAID) WRITE HOLE SOLUTIONS

The present disclosure pertains to the field of non-volatile storage and, in particular, to providing cost-effective and backwards-compatible solutions to a redundant array of independent disks (RAID) write hole effect.

BACKGROUND

A Redundant Array of Independent Disks (RAID) combines a plurality of physical disk drives into a logical drive for purposes of reliability, capacity, or performance. Instead of multiple physical disk drives, an operating system sees the single logical drive. As is well known to those skilled in the art, there are many standard methods referred to as RAID levels for distributing data across the physical hard disk drives in a RAID system.

For example, a level 5 RAID system provides a high level of redundancy by striping both data and parity information across at least three disk drives. Data striping is combined with distributed parity to provide a recovery path in case of failure. In RAID technology, strips of a drive can be used to store data. A strip is a range of logical block addresses (LBAs) written to a single drive in a parity RAID system. A RAID controller may divide incoming host writes into strips of writes across the member drives. A stripe is a set of corresponding strips on each member drive in the RAID volume. In an N-drive RAID 5 system, for example, each stripe contains N–1 data-strips and one parity strip. A parity strip may be the exclusive OR (XOR) of the data in the other strips in the stripe, and the drive that stores the parity for the stripe may be rotated per-stripe across the member drives. Parity may be used to restore data on a drive of the RAID system should the drive fail, become corrupted or lose power. Different algorithms may be used that, during a write operation to a stripe, calculate partial parity that is an intermediate value for determining parity.

A RAID write hole (RWH) is a fault scenario, related to parity-based RAID that occurs when a power failure (or system crash) and a drive failure (e.g., strip read or drive crash) occur at the same time or close to each other. These system crashes and drive failures are often correlated events. This can lead to silent data corruption or irrecoverable data due to a lack of atomicity of write operations across member drives in a parity-based RAID system. Due to the lack of atomicity, the parity of an active stripe during a power failure may be incorrect, e.g., inconsistent with the rest of the strip data across a stripe. The data on such inconsistent stripes does not have the desired protection, and worse, can lead to incorrect corrections, which may create silent data errors within parity-based RAID system.

DESCRIPTION OF EMBODIMENTS

Figure 1A:
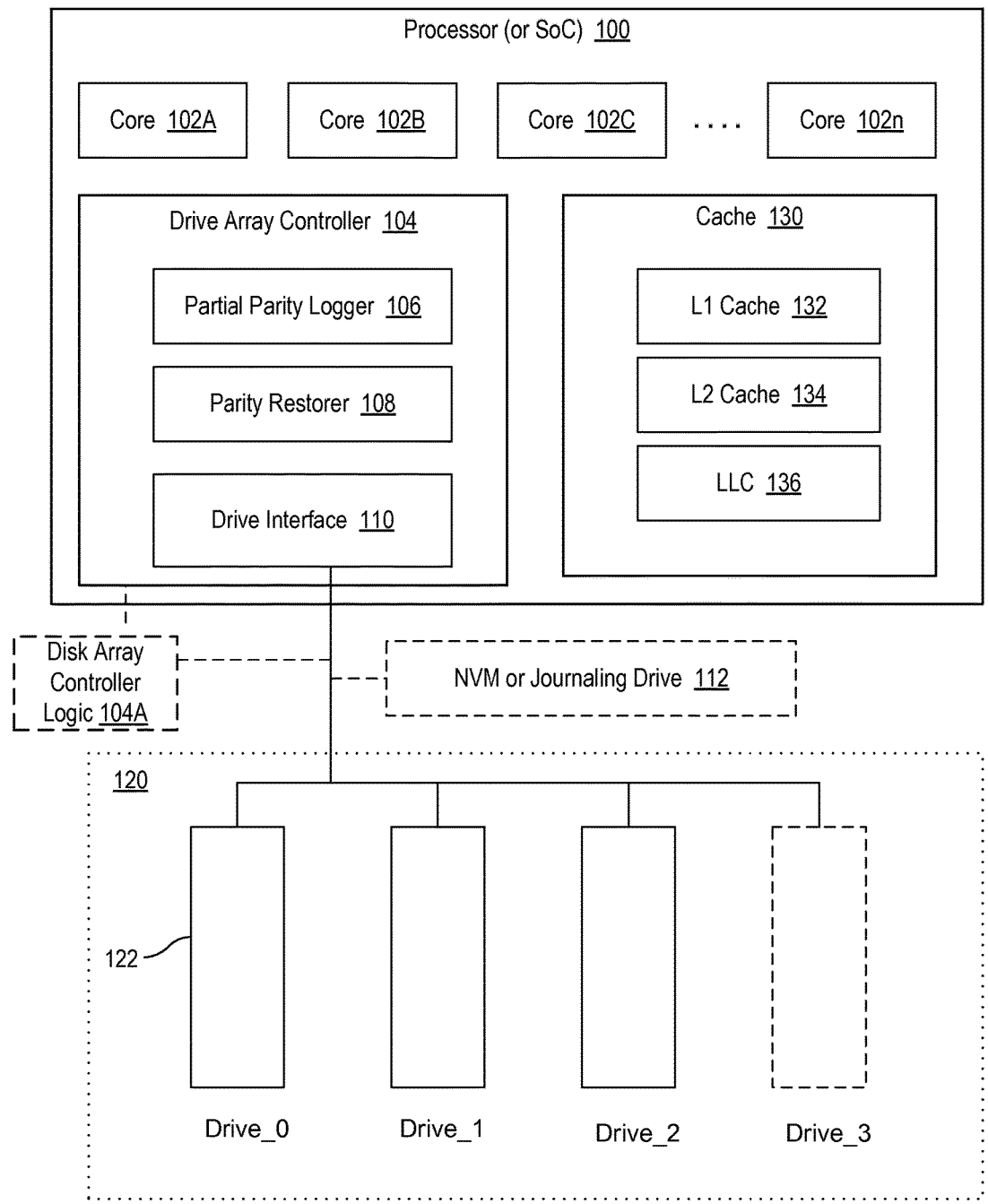
FIG. 1A is a block diagram of an exemplary processor or system including a drive array controller to control a redundant array of independent disks (RAID) sub-system according to one embodiment.

One solution to a redundant array of independent disks (RAID) write hole (RWH) event is to buffer writes on non-volatile (NV) media. Hardware drive array controllers typically provide an option to include non-volatile media, for example, a battery-backed volatile memory such as a Dynamic Random Access Memory (DRAM) unit (BBU), NV dual in-line memory module (DIMM) or other NV memory such as, three-dimensional (3D) cross-point memory, ferroelectric memory, silicon-oxide-nitride-oxide-silicon (SONOS) memory, polymer memory such as ferroelectric polymer memory, nanowire, ferroelectric transistor random access memory (FeTRAM or FeRAM), ovonic memory, nanowire, PCMS (phase change memory with switch), phase change memory, memristors, Spin Transfer Torque (STT)-magnetoresistive random access memory (MRAM) and MRAM to buffer writes and parity data. This data is used for recovery should a RAID member drive fail or in the case of power failure. This may be an expensive solution because of the additional hardware costs. Furthermore, the NV media becomes a primary performance bottleneck and endurance challenge since all data writes and corresponding parity writes are saved in this media.

Another solution includes saving an intermediate parity calculation, referred to as a partial parity log (PPL) value, to the RAID member drives when the RAID system is degraded, a RAID drive has failed. The PPL value may be combined with metadata that defines the PPL value as a PPL container (or just "PPL" for simplicity), which is written to an arbitrarily-chosen, functioning drive. The PPL value may be used to restore parity consistency after a RWH event occurs. The PPL value may be calculated as an exclusive OR (XOR) of the prior data that is being overwritten and the prior parity value in the stripe (for a read-modify-write operation). A dirty stripe journal (DSJ) may also be maintained to track the active stripes. The PPL value, therefore, is used to recover the data on the failed drive, such as in the case of a power failure, as per normal RAID processing, which will be discussed in more detail Unfortunately, this technique only partially solves the RWH in handling drive failure followed by a power failure, because this technique does not handle the reverse order of these failures: a power failure (or drive crash) followed by a drive failure. Furthermore, the time period between these two failures have to be long enough for all in-flight requests (sent to the RAID volume before the drive has failed) to be completed because, for those requests, there are no PPL values stored.

Embodiments of disclosed solutions may overcome the shortcomings of the above-referenced solutions. In one or more embodiments, a processor (or system) may execute drive array controller logic (or instructions) to, while a series of RAID drives operates without a failed drive, calculate partial parity log (PPL) values for write operations received by a processor core (or other processor), where the write operations target active stripes of the series of drives. The drive array controller logic may then store the PPL values for respective write operations in a pre-allocated portion of the series of drives, where the pre-allocated portion for a write operation depends on the active stripe to which a PPL value corresponds.

Figure 2:
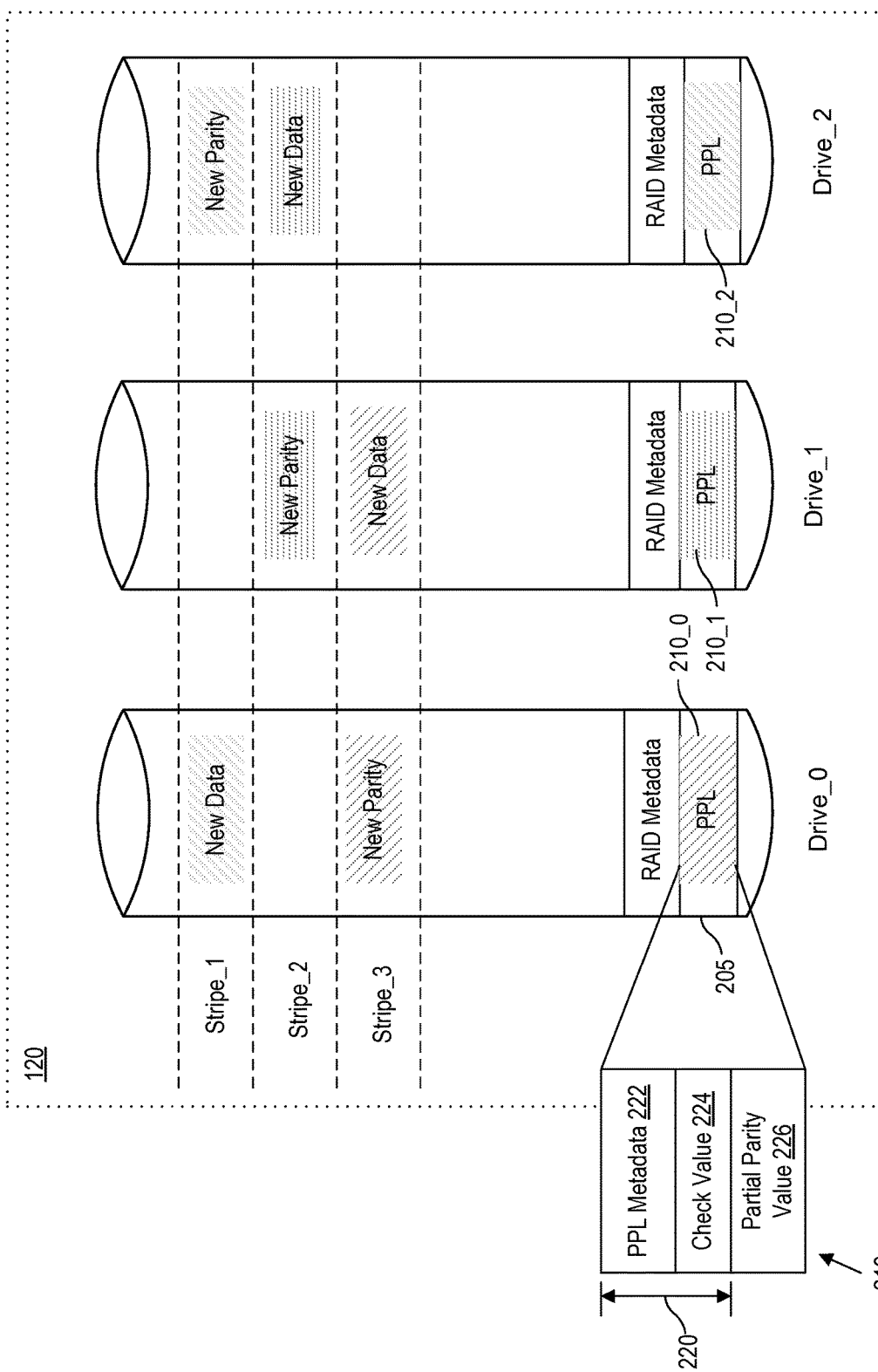
FIG. 2 is a diagram of an example solution to a RAID write hole (RWH) within parity-based RAID systems according to one embodiment of the present disclosure.

In one embodiment, the pre-allocated portion may be located at an end of a parity drive (e.g., upper addressable blocks), where the parity drive is the same drive to which new parity values are written for a given active stripe, and is rotated per-stripe across the series of drives (described in more detail with respect to FIG. 2). The PPL value may be calculated differently depending on whether the write operation is a read-modify-write (RMW) operation or a read-others write (RO) operation, and metadata may also be added that defines the PPL value and provides for error checking, resulting in a final PPL container that is stored at the end of the parity drive. A container may be considered to be a portion of storage of a particular size in which to aggregate data. The container may then be stored on a drive (hard disk drive (HDD) or solid state drive (SSD)). In one embodiment, the calculation and storage of the PPL value may be performed at runtime, e.g., before issuing target-drive writes and parity-drive writes for a RAID configuration in normal state, e.g., a state in which no drive has failed.

In another embodiment, the PPL values are calculated for write operations as just discussed. In this example, however, the PPL values may be written for each write to a corresponding active stripe by using an additional (or spare) drive that makes possible storing respective PPL values in a strip of the active stripe. More specifically, the drive array controller logic may store the PPL values for respective write operations in corresponding active stripes across strips of the series of drives, alternating through the series of drives across respective active stripes (described in more detail with respect to FIG. 3). In this embodiment, the extra drive means that parity may be stored on a strip, the PPL values may be stored on another strip, and data may be stored on a remainder of the strips of each active stripe.

In yet another embodiment, the PPL values are calculated for write operations while the series of RAID drives operates without a failed drive. In this example, however, the processor or system may direct the drive array controller to store the PPL values for respective write operations in a faster non-volatile (NV) journaling drive that is not a member drive of the RAID system 120. Additional embodiments are envisioned in which the PPL is stored to a dedicated portion of the RAID volume or to an external NV media to be used to make parity consistent for one or more stripes before performing RAID recovery on a failed drive of a RAID system.

FIG. 1A is a diagram of an exemplary processor 100, which may also be implemented as a system such as a system on a chip (SoC), including a drive array controller 104 to control a redundant array of independent disks (RAID) 120 (or RAID system 120) according to one embodiment. A SoC is an integrated circuit (IC) that integrates components of a computer into a single IC with a common carrier substrate. The processor 100 may also be a system in package in which a number of integrated circuits are implemented in a single package. The processor 100 may further include a plurality of processor cores 102A, 102B, 102C and 102n, and a cache 130 that includes L1 cache 132, L2 cache 134 and a last level cache (LLC) 136, for example.

In one embodiment, the processor executes drive array controller logic 104, which is optional (as shown in dashed lines) to perform the embodiment disclosed herein. For example, the drive array controller logic 104A may be executed as software instructions within an operating system of a host computing device such as a server. In one embodiment the instructions execute an enhanced version of Rapid Storage Technology enterprise (RSTe) by Intel® of Santa Clara, Calif. The RSTe RAID controller configures and manages RAID logic and support, including data protection and recovery operations after a RWH event, in part from use of certain device driver(s) to control the RAID drives.

The drive array controller 104 (or the drive array controller logic 104A) may include, among other components, a partial parity logger 106, a parity restorer 108 and a drive interface 110 with which to communicate with the RAID system 120. The drive array controller 104 may be implemented in hardware, software or a combination of hardware and software.

The RAID system 120 may include a series of drives controlled according to RAID logic. For simplicity of explanation, the RAID system 120 is discussed as having three or four drives, where the fourth drive is optional. These drives 122 are labeled as Drive_0, Drive_1, Drive_2 and Drive_3, respectively, where Drive_3 being optional is indicated with dashed lines. While the present disclosure focuses for purposes of explanation on a RAID level 5 configuration, which requires at least three drives, the present disclosure may be applied to different RAID levels and different numbers of drives with a RAID system, e.g., to RAID 4, RAID 5, RAID 6 and RAID 50.

Figure 1B:
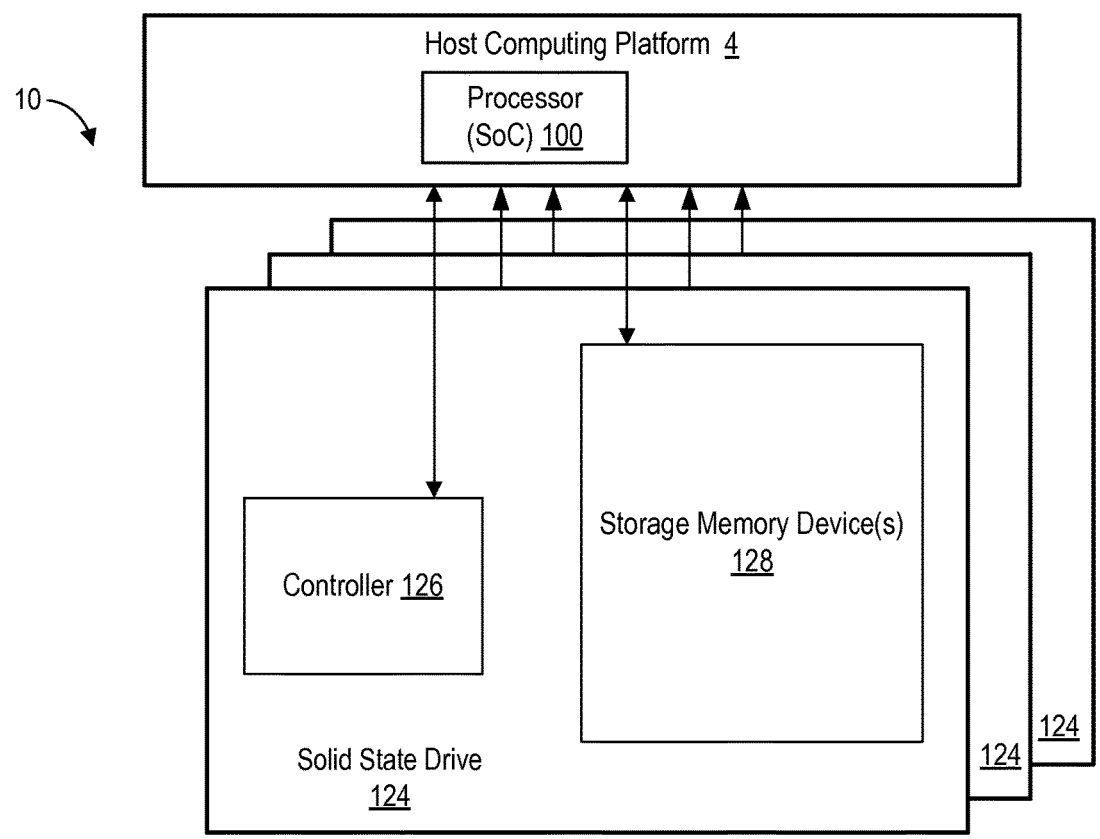
FIG. 1B is a block diagram of an exemplary computer system including an exemplary solid state drive useable in a RAID system in the disclosed embodiments.

FIG. 1B is a block diagram of an exemplary computer system 10 including solid state drives (SSDs) 124 useable in the RAID system 120 of FIG. 1A. The SSDs 124 may be the drives 122 in FIG. 1A. The computer system 10 may include a host computing platform 4 with the processor (or SoC) 100. The host computing platform 4 is communicably coupled to the SSDs 124 using an input/output (I/O) interface. For example, the SSDs 124 may each include a Serial Advanced Technology Attachment (SATA) connector that connects to physical interconnects of the host computing platform 4. As noted above, the I/O interface may be arranged as a SATA interface to couple elements of the host computing platform 4 to one or more of the SSDs 124. In another example, the I/O interface may be arranged as a Serial Attached SCSI (SAS) interface to couple elements of the host computing platform 4 to one or more SSDs 124. In another example, the I/O interface may be arranged as a Peripheral Component Interconnect Express (PCIe) interface to couple elements of the host computing platform 4 to one or more SSDs 124. In another example, the I/O interface may be arranged using Non-Volatile Memory (NVM) Express (NVMe) protocol over PCIe to couple elements of the host computing platform 4 to one or more SSDs 124.

The respective SSD 124 may also include, but not be limited to, a controller 126 and storage memory devices 128.

The controller 126 (also referred to as a SSD controller) can receive commands issued by the host computing platform 4 for writing/reading information to/from the storage memory devices 128.

In some examples, the storage memory device(s) 128 may include one or more chips or dies that may individually include one or more types of non-volatile memory (NVM) including, but not limited to, NAND flash memory, NOR flash memory, three dimensional (3D) cross-point memory, ferroelectric memory, silicon-oxide-nitride-oxide-silicon (SONOS) memory, polymer memory such as ferroelectric polymer memory, ferroelectric transistor random access memory (FeTRAM) or FeRAM), ovonic memory, nanowire, PCMS (phase change memory with switch), phase change memory, memristors, Spin Transfer Torque (STT)-magnetoresistive random access memory (MRAM), MRAM or any other suitable non-volatile memory. For these examples, the drives 122 of FIG. 1A may be arranged or configured as solid-state drives (SSDs) as depicted in FIG. 1B. Examples are not limited to drives arranged or configured as SSDs, as other storage devices such as a hard disk drive (HDD) are contemplated.

With further reference to FIG. 1A, an active write is a write operation from a computing device (such as the host computing platform 4) that is in progress (e.g., not completed). A stripe or strip that is being written to is called an active stripe or active strip, respectively. When the processor 100 receives a write operation, the processor 100 may direct the drive array controller 104 to perform generally one of two write operations to the RAID system 120, either a read-modify-write (RMW) or a read-others (RO) write operation.

More specially and by way of example, for a RAID 5 write operation, the processor 100 may perform a read-modify-write operation as follows. The partial parity logger 106 may perform an XOR of the prior (or "old") data at the strip targeted by the write with a corresponding prior parity strip to calculate a partial parity log (PPL) value for the stripe. The processor 100 may further perform the XOR on this PPL value with new data to generate the new parity. The RAID 5 write portion of the read-modify-write operation may be completed with the drive array controller 104 writing the new data and new parity, overwriting the old data and the prior parity of the stripe.

An alternative to the read-modify-write operation is a read-others write operation. For a read-others write operation, the partial parity logger 106 may calculate the PPL value by performing an XOR on data read from the member drives of the RAID system 120 that are not involved in the write operation, e.g., from the inactive strips of the active stripe. Two special cases of a read-others write operation exist for a RAID 5 configuration employing three drives. In one special case, one data drive is written so the value for an active stripe is derived from the data drive that is not written. For another special case, both data drives are written so there is no PPL value, but the parity value may still be directly calculated.

Figure 3:
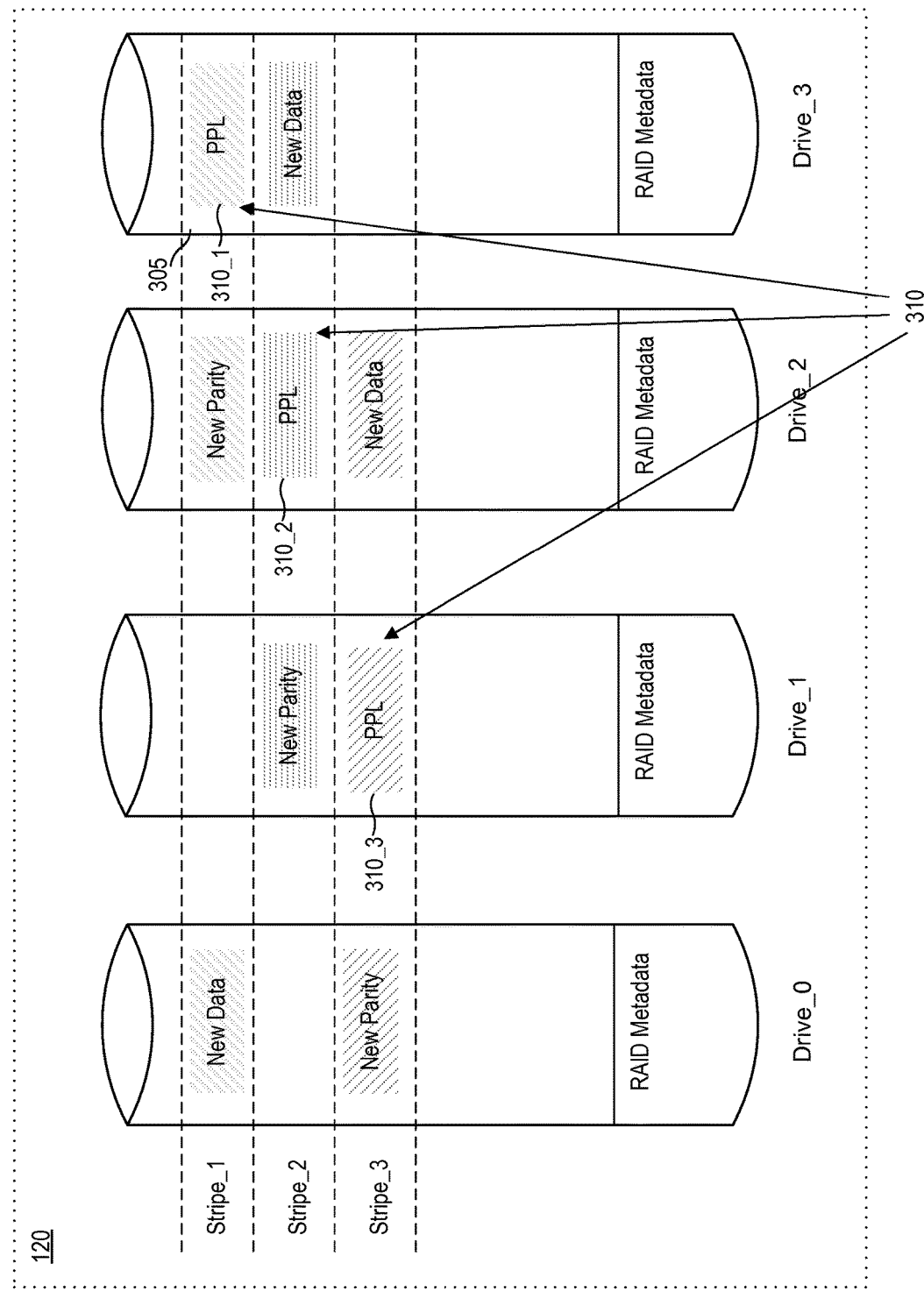
FIG. 3 is a diagram of an example solution to a RWH within parity-based RAID systems according to another embodiment of the present disclosure.

Whether performing the PPL value calculation for the RMW operation or for a read-others (RO) write operation, the partial parity logger 106 may add metadata to the PPL value that defines the PPL value and provides for error checking, resulting in the final PPL container (210 in FIGS. 2 and 310 in FIG. 3). The PPL may be stored in a pre-allocated portion of the RAID system 120 or in the journaling drive 112, as will be explained in more detail with reference to FIGS. 2 through 6.

In the case of a partial-strip write within the stripe according to one embodiment, the drive array controller 104 (or drive array controller logic 104A) may logically divide the stripe into sub-stripes, for which the partial-strip write is a full-strip write for a sub-stripe. The partial parity logger 106 may then calculate a PPL sub-value for respective sub-stripes and calculate the PPL value for the stripe as a concatenation of the PPL sub-values. In this way, the partial parity logger 106 may calculate a proper PPL value for a stripe in which only a partial-strip write has been performed.

In the case of a write operation that spans across two or more strips, e.g., a multiple-strip write, the partial parity logger 106 may calculate the PPL value as an XOR of the prior data in each of the multiple strips and the prior parity value. This may be expressed as follows where "^" indicates an XOR operation:

$$\text{PPL Value} = D1_{prior} \char`\^ D2_{prior} \char`\^ \ldots \char`\^ Dn_{prior} \char`\^ P_{prior}$$

The processor 100 may also have access to a journaling drive 112 or other non-volatile media (NVM) in which to store the PPL value or file according to one embodiment, as will be explained in more detail with reference to FIG. 4. The journaling drive 112 may be a faster drive that can improve performance in some RAID configurations at the cost of the additional NVM. As just two non-limiting examples, a solid state drive (SSD) with NAND memory may be used as a journaling drive for hard disk drive (HDD)-RAID configurations and a solid state drive with three-dimensional (3D) cross point memory may be used for NAND-SSD-RAID configurations. In each case, the journaling drive 112 uses a faster access type of memory. The journaling drive 112 may also lessen endurance and performance impacts of storing PPL values and files to the member drive(s) of the RAID system 120, but may not be as cost effective with the addition of the journaling drive 112.

Before performing a RAID recovery operation on the failed drive, each active-marked stripe is first made parity-consistent. The parity consistency may be restored for these stripes by the parity restorer 108 performing an XOR of the PPL of these stripes with data from the active-marked drives in the stripe. Accordingly, a new parity value ($P_{new}$) may be calculated as:

$$P_{new} = PPL \char`\^ D_{active\text{-}strips}.$$

This approach restores stripe parity consistency regardless of whether the active data and parity drives contain old (prior to the associated write during power-fail) or new data that was in the process of being written during power-loss for the stripe. When the data on active stripes is new data, the parity is made consistent as follows:

$$P_{new} = PPL \char`\^ D_{new} = D_{prior} \char`\^ P_{prior} \char`\^ D_{new}.$$

Otherwise, when the data on active stripes is prior data, the parity is made consistent as follows:

$$P_{new} = PPL \char`\^ D_{prior} = D_{prior} \char`\^ P_{prior} \char`\^ D_{prior} = P_{prior}.$$

FIG. 2 is a diagram of an example solution to a RAID write hole (RWH) effect within parity-based RAID systems according to one embodiment. In the embodiment of FIG. 2, the partial parity logger 106 may calculate a PPL value for write operations, as discussed above with reference to FIG. 1, while the RAID system 120 operates without a failed drive. Furthermore, the PPL value may be stored in a pre-allocated portion 205 of a parity drive. For example, the parity drive may be the drive where new parity values are written for a given active stripe and is rotated per-stripe across the series of RAID drives. In this example, the pre-allocated portion 205 may be located at an end of the parity drive (e.g., upper addressable blocks) as reserved by a part of the RAID logic as executed by the drive array controller 104 (or the drive array controller logic 104A). This reserved space may be a relatively small portion of each drive, such as, for example, less than one percent of the total volume of the drive.

FIG. 2, furthermore, illustrates an entire PPL (or partial parity log) container 210 stored on respective parity drives of the RAID system 120 (such as a RAID 5 system). After a partial parity (or PPL) value 226 has been calculated, the partial parity logger 106 may combine the PPL value 226 with PPL metadata 222 that defines the PPL value 226 and provides information with which to restore parity consistency to one or more stripes of the RAID system 120. In one embodiment, the drive array controller 104 may perform a checksum (such as a cyclic redundancy check) of the PPL value 226, to generate a check value 224. Upon later retrieval of the PPL value 226, the same checksum may be performed to generate another check value with which to compare to the check value 224, to verify the PPL value 226 has not been corrupted. The combination of the PPL value 226, the PPL metadata 222 and the check value 224 may form a PPL container 210 (or referred to simply as the PPL 210). The PPL metadata 222 and the check value 224 may be stored in a header portion 220 of the PPL container 210, identifiable as separate from the PPL value 226. In other embodiments, the check value 224 may not be generated.

As applied to stripe_1 of FIG. 2, new data is written to drive_0 and a new parity value is written to drive_2. Accordingly, a PPL 210_2 for stripe_1 may also be written to drive_2, the parity drive. Similarly, as applied to stripe_2, new data is written to drive_2 and a new parity value is written to drive_1. Accordingly, a PPL 210_1 for stripe_2 may also be written to drive_1, the parity drive for stripe_2. Similarly, as applied to stripe_3, new data is written to drive_1 and a new parity value is written to drive_0. Accordingly, a PPL 210_0 for stripe_3 may also be written to drive_0.

Because the PPL values are calculated for on-going writes during normal operation, the PPL values are available if a data drive fails for use in restoring parity consistency in the case of a RWH event. With parity consistency in place, the processor 100 may perform a RAID recovery of the failed drive. If the parity drive fails, the PPL is lost, but parity can be recreated from the data stored in the data drives and no data is lost. Saving the PPL in the drive with parity leads to higher endurance because the PPL is rotated and stored across the drives in the RAID system. This approach also helps with the member drives such that no single drive becomes the bottleneck. These same advantages also apply to the embodiment of FIG. 3.

FIG. 3 is a diagram of an example solution to a RAID write hole within parity-based RAID system according to another embodiment. In the embodiment of FIG. 3, the RAID system is made up of four drives, drive_0, drive_1 and drive_2, which include the minimum three drives for RAID level 5, and a spare or additional drive, drive_3. While drive_3 may be used to rebuild a failed drive, drive_3 may also be used as any other RAID member drive while the other three drives are operational. Accordingly, in this embodiment, the partial parity logger 106 may calculate a partial parity log (PPL) value 310 for on-going write operations and store the PPL values on a separate drive strip apart from the parity drive, in contrast to the embodiment of FIG. 2.

More specifically, the processor 100 may direct the drive array controller 104 to store the PPL values (or PPLs) for respective write operations in corresponding active stripes across strips of the series of drives, alternating through the series of drives across respective active stripes. In this embodiment, the extra drive (drive_3) means that parity may be stored on a strip, the PPL values (or PPLs) may be stored on another strip, and data may be stored on a remainder of the strips of each active stripe, rotating per-stripe across the series of drives.

FIG. 3 illustrates this by way of example using a RAID 5 configuration and four total drives. For stripe_1, new data may be written to drive_0, a new parity value written to drive_2, the parity drive, and a PPL 310_1 may be written to drive_3, which is separate from the parity drive. Furthermore, for stripe_2, new data may be written to drive_3, a new parity value may be written to drive_1, the parity drive, and a PPL 310_2 may be written to drive_2. Additionally, for stripe_3, new data may be written to drive_2, a new parity value written to drive_0, the parity drive, and a PPL 310_3 written to drive_1. While the algorithms and operations to determine the PPL values remains as discussed above, the placement of the PPL as written to the RAID system 120 may change.

If any of the four drives of the RAID system 120 fails, the distributed spare space (by virtue of having an extra drive, drive_3) may be used to rebuild the RAID system 120. The remaining three drives may still fully provide redundant data services according to RAID 5, even without one of the four drives. Furthermore, the PPL values may still be calculated, but cannot be stored in spare space (because it is no longer available). The PPL mode may, in this case, be automatically switched to any of the remaining two PPL storage options, namely within a reserved portion at an end of a parity drive or on a separate journaling drive.

Figure 4:
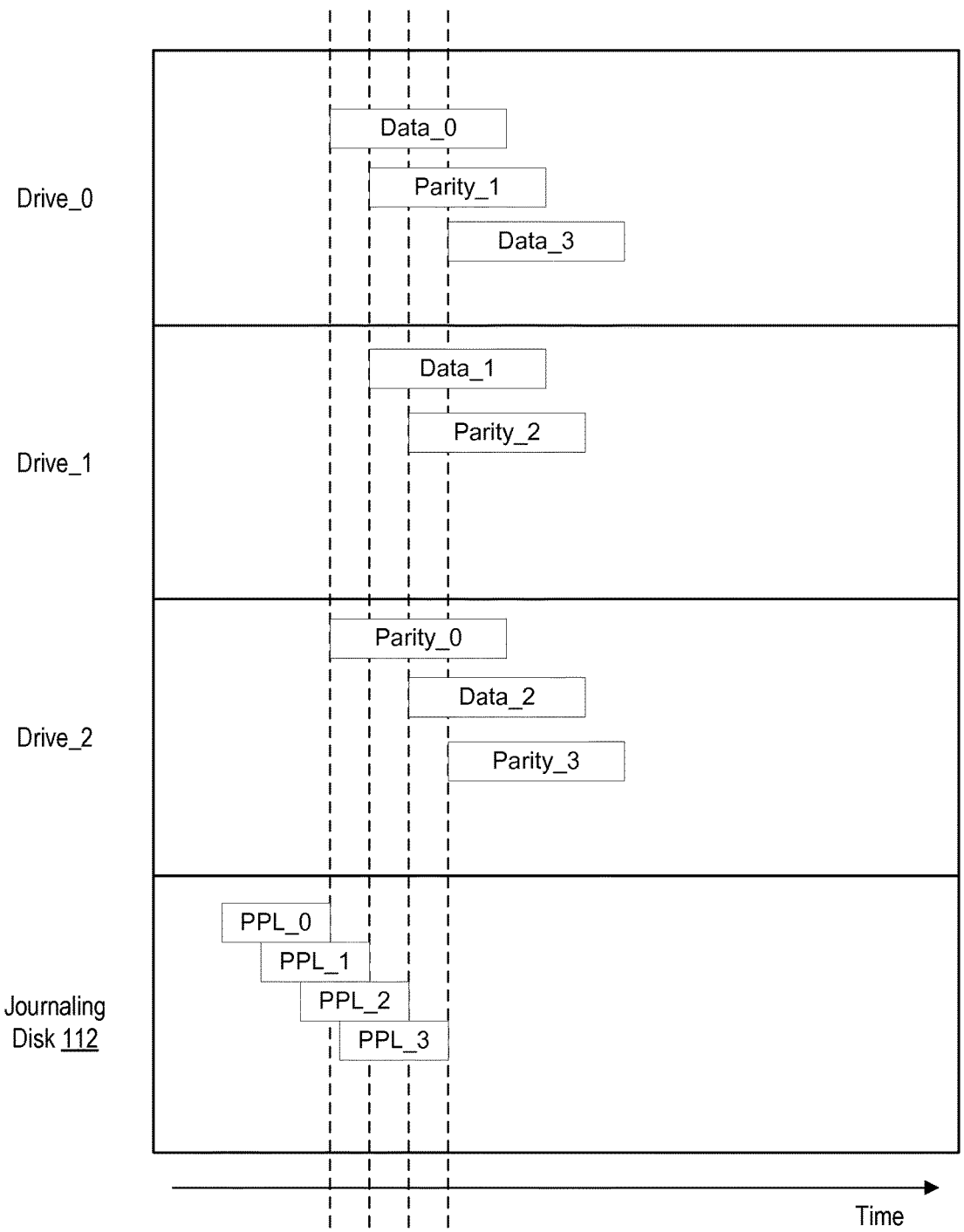
FIG. 4 is a diagram of an example solution to a RWH within parity-based RAID systems according yet another embodiment of the present disclosure.

FIG. 4 is a diagram of an example solution to a RAID write hole within parity-based RAID systems according to yet another embodiment. In the embodiment of FIG. 4, the RAID system 120 is made up of three RAID drives (for purposes of explanation) and the journaling drive 112 discussed with reference to FIG. 1. In FIG. 4, the PPL value may be saved in a pipelined manner to the journaling drive 112, without requiring additional read operations or write operations to the RAID member drives. Accordingly, the PPL value writes to the journaling drive require no performance-throughput penalty, but does call for NVM buffering costs (although lower than previous approaches).

In FIG. 4, the PPL value may be calculated as part of a RAID 5 write algorithm regardless of whether the PPL value is actually saved. The throughput impact of the write may be nullified by pipelining the PPL value writes, with the data and the parity writes, to the journaling drive 112. The x-axis is time and each of the rectangles indicates a write operation (whether data, parity or PPL). Reads are omitted for clarity. Note the staged execution of various data and parity writes to the RAID member drive, but that the PPL value write for any given stripe is written to the journaling drive 112 before the data and parity for that stripe is written. The journaling drive 112 may be much faster than the member drives to ensure this proper timing. As just two non-limiting examples, a solid state drive (SSD) with NAND memory may be used for hard disk drive (HDD)-RAID configurations and a SSD with three-dimensional (3D) cross point memory may be used for NAND-SSD-RAID configurations.

Figure 5:
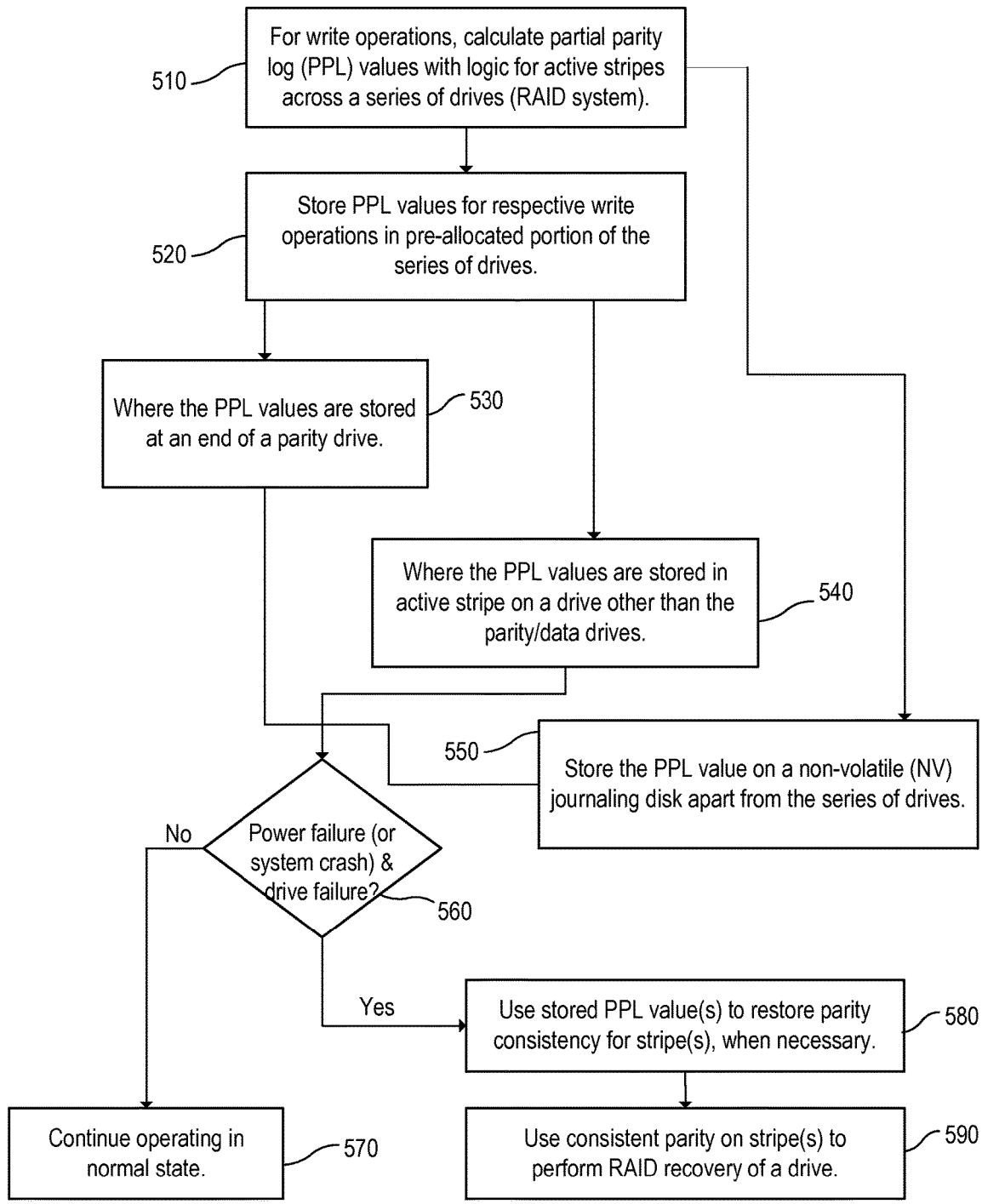
FIG. 5 is a flowchart of a method for resolving RAID write hole within parity-based RAID systems according to one embodiment.

FIG. 5 is a flowchart of an exemplary method for resolving RAID write hole within parity-based RAID systems. The method may be performed by the drive array controller 104 or by the processor 100 executing drive array controller logic 104A. The drive array controller logic may, while a series of drives in a RAID configuration operates without a failed drive, calculate partial parity log (PPL) values for respective write operations received by the processor, where the write operations target active stripes across the series of drives (510). The drive array controller logic may further store the PPL values for respective write operations in a pre-allocated portion of the series of drives (520). In one embodiment, the pre-allocated portion for the PPL values is at an end of a parity drive (e.g., at upper addressable blocks) as allocated by the drive array controller logic (530). In another embodiment, the PPL values may be stored in active stripes on a drive other than the parity and data drives, and may be rotated per-stripe across strips of the series of drives (540). In yet a further embodiment, the drive array controller logic may store the PPL values on a faster non-volatile journaling drive that is not one of the series of drives that make up the series of drives (550). As discussed, these PPL values may further be augmented with metadata defining the PPL values and check value for integrity of the PPL values, forming respective PPL containers that are actually what is stored.

The drive array controller (or drive array controller logic) may further detect whether there has been a power failure (or system crash) combined with a drive failure (560). If no such series of events occurs, the RAID system continues to operate in normal state (570). If such a series of events occurs, the parity restorer 108 may use the stored PPL value(s) to restore parity consistency for stripe(s), as necessary (580). The processor 100, in conjunction with the drive array controller 105 or executing the drive array controller logic 105A, may then use the consistent parity on the stripe(s) to perform RAID recovery of a drive (590).

Further to step 580, in the case of RWH occurrence, the recovery is to be performed before any new input/output (I/O) is processed by the RAID system 120. In practice, the recovery process starts right after system boot after a power-fail/crash, upon discovering a failed RAID member drive. For a given active stripe, there are a number of cases (some of which are outlined below), and these may be handled as follows:

Not Active-Marked Data Drive Fails (Primary RWH Case):

Because PPL is stored on the parity drive (for the above first embodiment), the PPL is still available and is used to recover from RWH as explained above.

Parity Drive Fails:

In this case, the PPL is lost, but it is not needed. The parity is recalculated using all other data drives.

Active-Marked Data Drive Fails:

While PPL is available, it is not needed. The strip data can be rebuilt later as an XOR of the strip data on the other drives. The recovered data may be old (or prior data), new or indeterminate (depending on whether the parity and data write requests to other drives completed prior to system crash), and either is acceptable since the active write was not completed to the host.

Partially Active Data Drive Fails:

The PPL is available and can be used to recover the non-active part of the strip as explained earlier with reference to RWH parity consistency recovery for a non-active marked data drive. The active part is not rebuilt; since the write was not completed to the host, it is acceptable for the active part to have indeterminate data, which may be written again by the host.

It is acceptable for the active data to be indeterminate, because it was not completed to the host, and there are mechanisms (e.g., a New Technology File System (NTFS) log) that can recover the data (e.g., by writing the data again). What is unacceptable is to have indeterminate data in non-active strips, which may arise in the RWH scenario. Because parity may be inconsistent with the active data, the non-active data could be recovered as indeterminate. In this case, the host does not know about the indeterminate data and thus does not attempt a solution (thus the reason for the present disclosure).

PPL Checksum Not Correct:

If, during the PPL recovery, PPL checksum does not match the checksum stored in the PPL header, then the recovery is not performed for this PPL portion. The recovery is not required in this case, because the write operation of data and parity corresponding to this particular PPL portion was not started.

Figure 6:
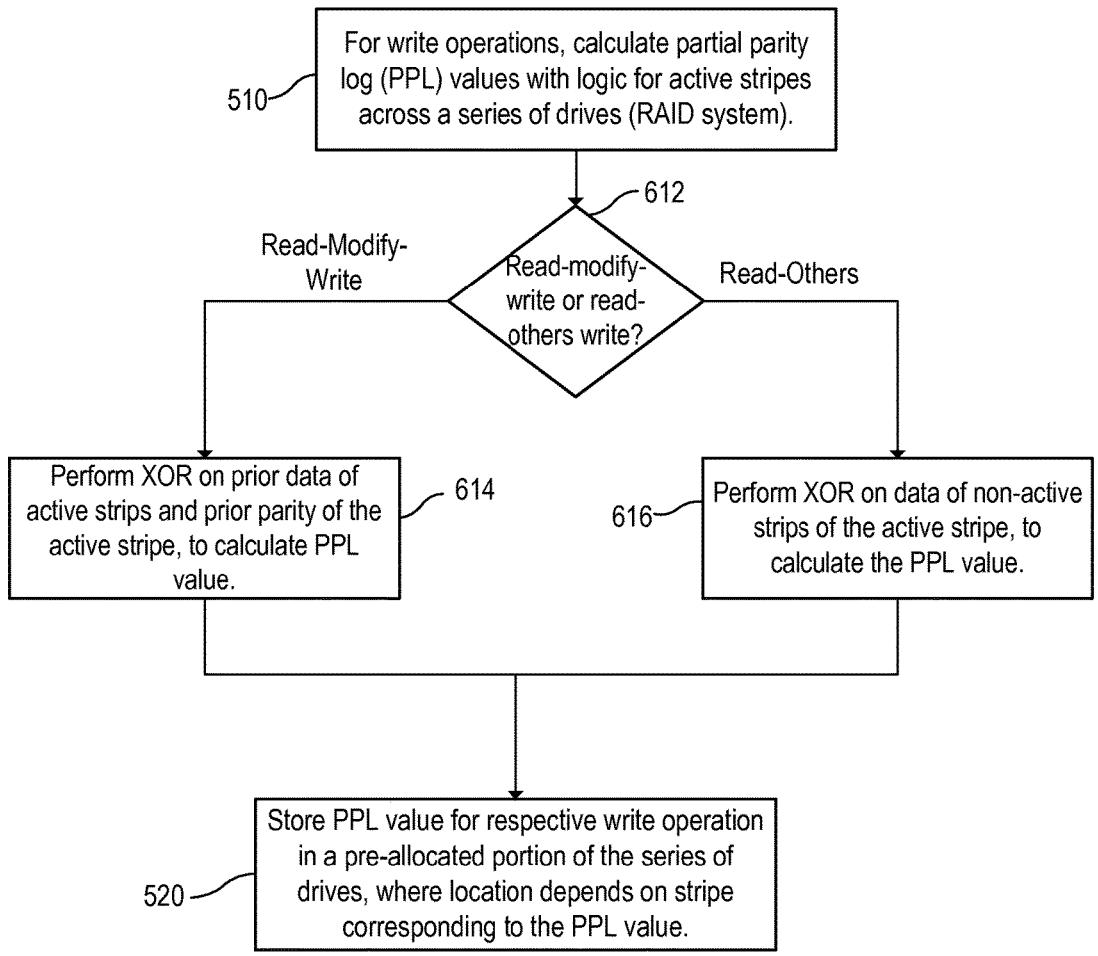
FIG. 6 is a flowchart of a method for determining how to calculate partial parity log values depending on type of write operation according to one embodiment.

FIG. 6 is a flowchart of an exemplary method for determining how to calculate partial parity log (PPL) values depending on type of write operation. As an extension of the method of FIG. 5, remember that the drive array controller logic may, while a series of drives in a RAID configuration operates without a failed drive, calculate partial parity log (PPL) values for respective write operations received by the processor, where the write operations target active stripes across the series of drives (510). The drive array controller may further determine, for each incoming write request, whether the write request is a read-modify-write (RMW) or a read-others (RO) write operation (612). When the write request is a read-modify-write, the drive array controller may perform an exclusive OR (XOR) on prior data of active strips and prior parity of the active stripes to calculate the PPL value (614). When the write request is a read-others write operation, the drive array controller may perform an XOR on data of non-active strips of the active stripes to calculate the PPL value (616). The drive array controller may then store the PPL value (or associated PPL data) for respective write operation in a pre-allocated portion of the series of drives (520), as already discussed.

Figure 7:
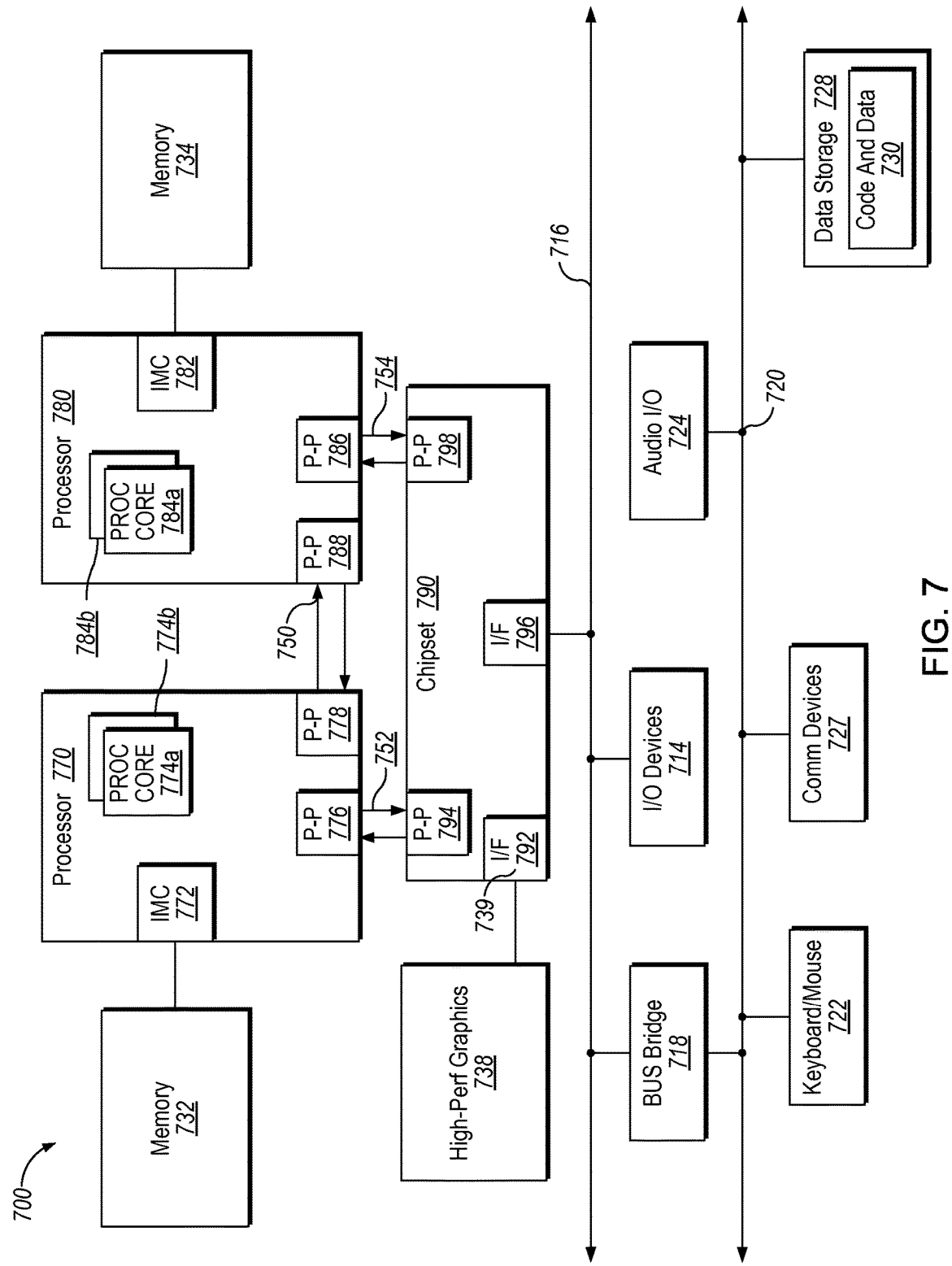
FIG. 7 is a block diagram of a computer system according to one implementation.

FIG. 7 illustrates a block diagram of a multiprocessor system 700 in accordance with one implementation. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774a and 774b and processor cores 784a and 784b), although potentially many more cores may be present in the processors. The processors each may include hybrid write mode logics in accordance with an embodiment of the present. The embodiments of the page additions and content copying can be implemented in the processor 770, processor 780, or in both.

While shown with two processors 770, 780, it is to be understood that the scope of the present disclosure is not so limited. In other implementations, one or more additional processors may be present in a given processor.

Processors 770 and 780 are shown including integrated memory controller units 772 and 782, respectively. Processor 770 also includes as part of its bus controller units point-to-point (P-P) interfaces 776 and 788; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with an input/output (I/O) controller 790 via individual P-P interfaces 752, 754 using point to point interface circuits 776, 794, 786, 798. The I/O controller 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

The I/O controller 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive, RAID solution or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

The communications devices 727 may further include the drive array controller 104 or 140A with a RAID system of drives, e.g., as a networked RAID device. The networked RAID device may be an Ethernet device, a Remote Direct Memory Access (RMDA) device, or a Fibre Channel device communicating over a network of compatible technology. The RAID device may be connected by an Ethernet cable or connected wirelessly, and obtain read and write commands through a network via an assigned network address, for example. The networked RAID device, furthermore, may communicate via Internet Protocol Version 4 (IPv4) or 5 (IPv5), InfiniBand® (IB), Omni-Path™ or other communication protocol that includes storage management capability.

Figure 8:
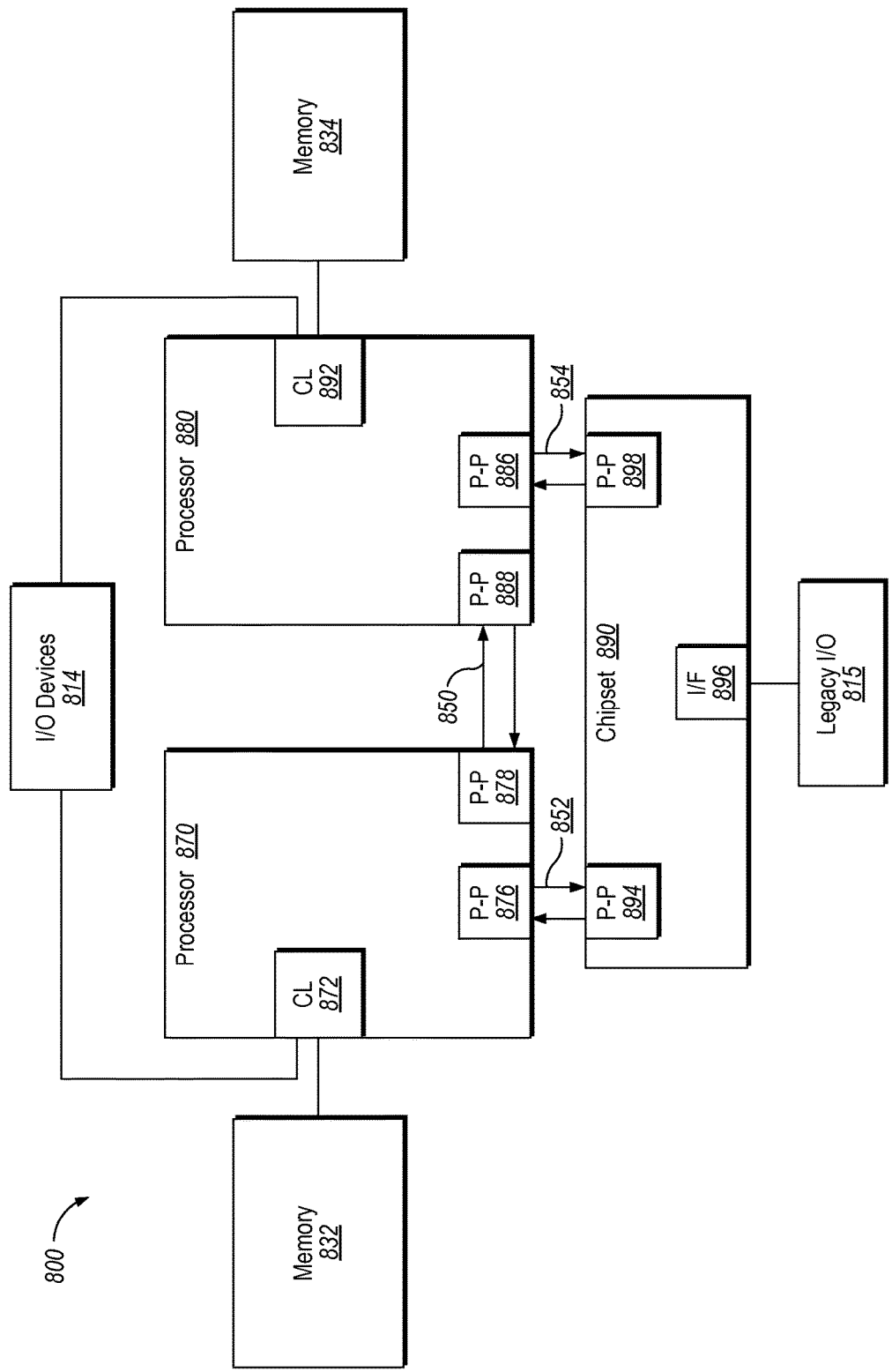
FIG. 8 is a block diagram of a computer system according to another implementation.

Referring now to FIG. 8, shown is a block diagram of a third system 800 in accordance with an embodiment of the present disclosure. Like elements in FIGS. 7 and 8 bear like reference numerals, and certain aspects of FIG. 7 have been omitted from FIG. 7 in order to avoid obscuring other aspects of FIG. 8.

FIG. 8 illustrates that the processors 870, 880, which may include (or direct) a drive array controller 104 and 104A, or be a RAID device, and may include integrated memory and I/O control logic ("CL") 872 and 882, respectively. For at least one embodiment, the CL 872, 882 may include integrated memory controller units such as described herein. In addition. CL 872, 882 may also include I/O control logic. FIG. 8 illustrates that the memories 832, 834 are coupled to the CL 872, 882, and that I/O devices 814 are also coupled to the control logic 872, 882. Legacy I/O devices 815 are coupled to the chipset 890. The embodiments of the page additions and content copying can be implemented in processor 870, processor 880, or both. Note that the lines connecting the CL 872 and the I/O devices 814, or a line directly between the CL 872 and CL 892, may be any type of bus connection, from PCIe to a network bus connection implemented under any number of network protocols, such as Ethernet, InfiniBand®, Fibre Channel, IPv4, IPv5 or the like.

Figure 9:
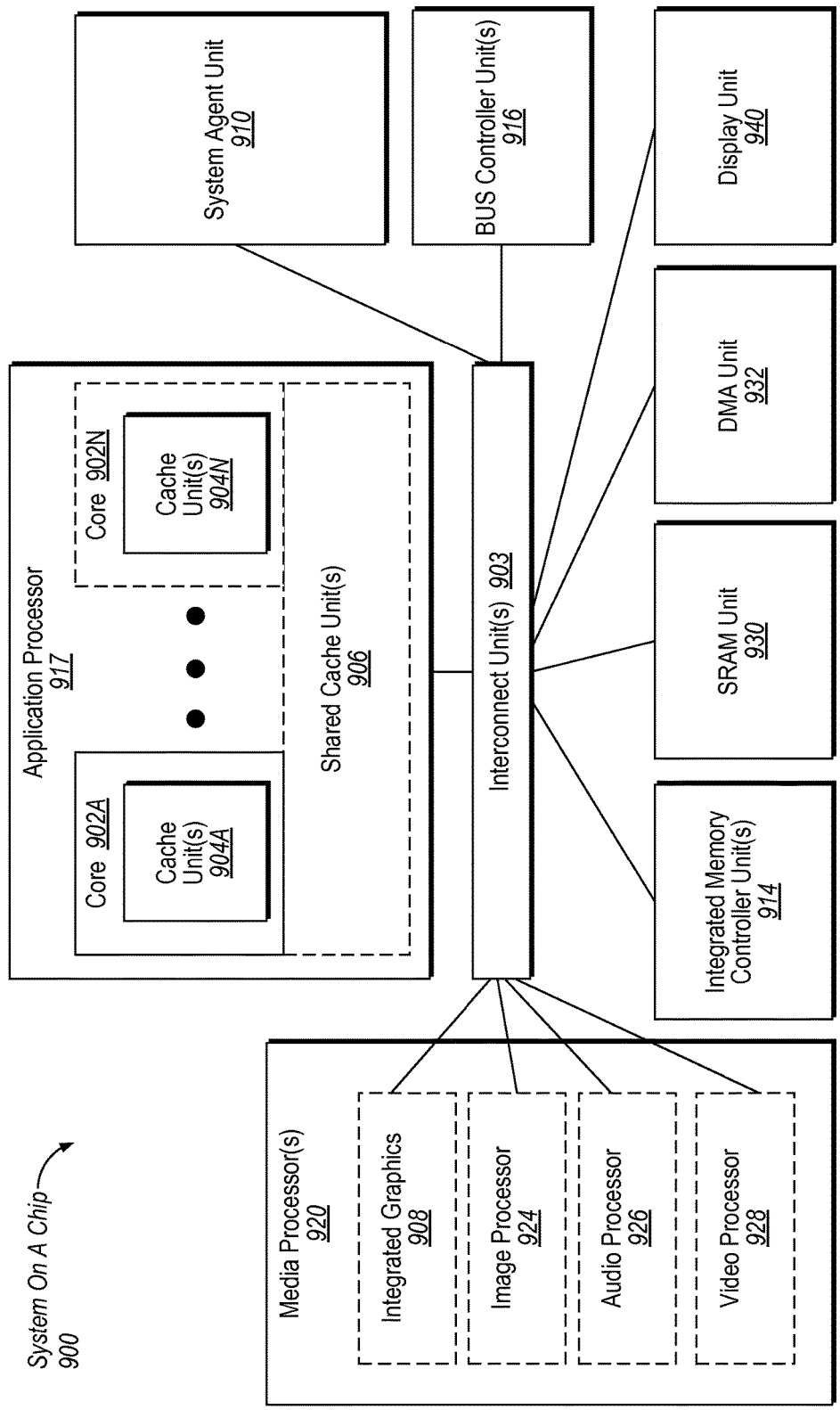
FIG. 9 is a block diagram of a system-on-a-chip according to one implementation.

FIG. 9 is an exemplary system on a chip (SoC) 900 that may include one or more of the cores 902. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 9 is a block diagram of a SoC 900 in accordance with an embodiment of the present disclosure. Dashed lined boxes are features on more advanced SoCs. In FIG. 9 an interconnect unit(s) 903 is coupled to: an application processor 917 which includes a set of one or more cores 902A-N and shared cache unit(s) 906; a system agent unit 910; a bus controller unit(s) 916; an integrated memory controller unit(s) 914, which could include the drive array controller 104 or 104A; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays. The embodiments of the pages additions and content copying can be implemented in SoC 900.

Figure 10:
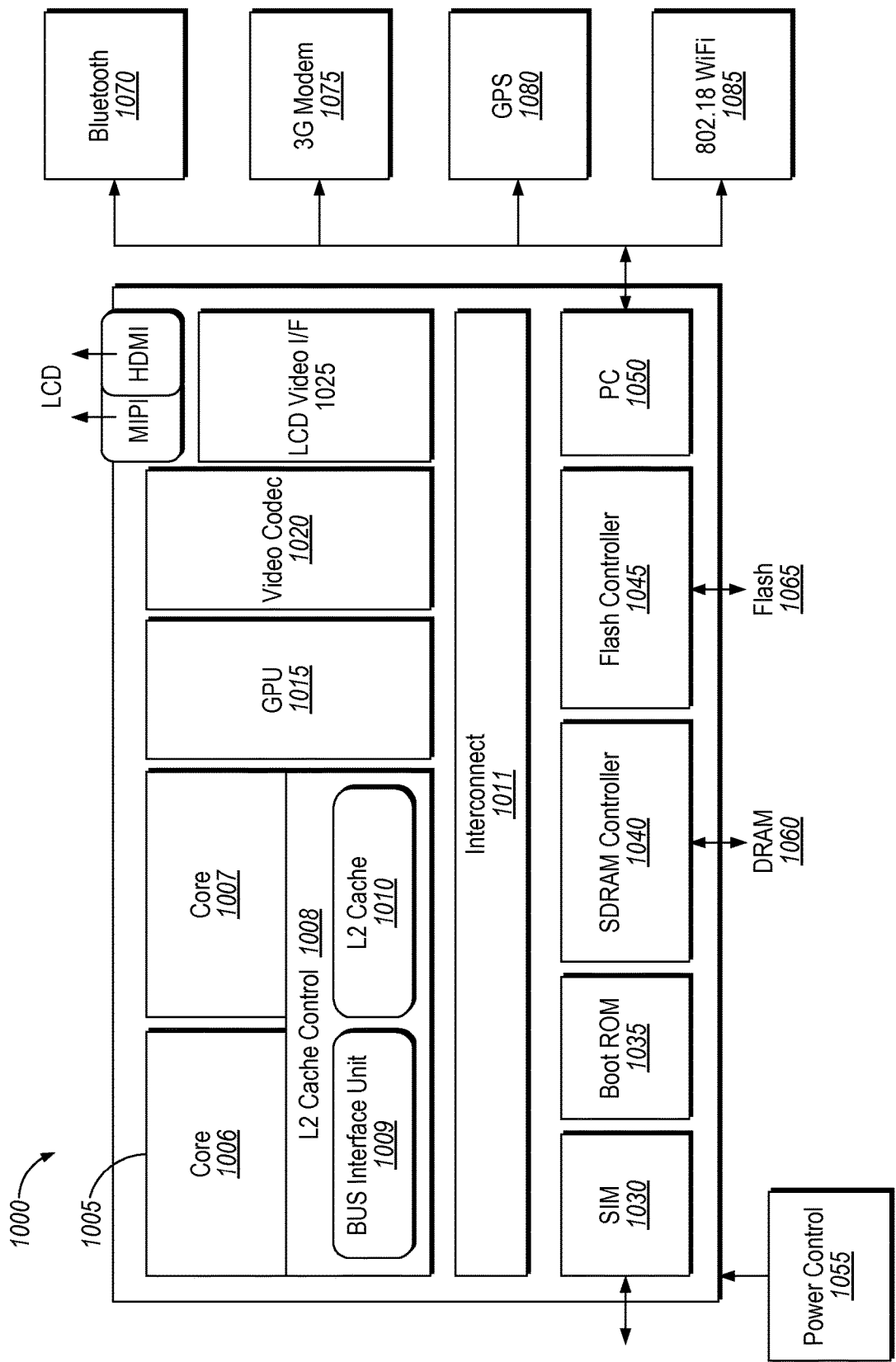
FIG. 10 illustrates another implementation of a block diagram for a computing system.

Turning next to FIG. 10, an embodiment of a system on-chip (SoC) design in accordance with embodiments of the disclosure is depicted. As an illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1000.

Here, SoC 1000 includes 2 cores—1006 and 1007. Similar to the discussion above, cores 1006 and 1007 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of SOC 1000. Interconnect 1011 includes an on-chip interconnect, such as an IOSF, AMBA, or other interconnects discussed above, which can implement one or more aspects of the described disclosure.

Interconnect 1011 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g.

Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the embodiments described herein.

In addition, the system illustrates peripherals for communication, such as a Bluetooth module 1070, 3G modem 1075, GPS 1080, and Wi-Fi 1085. Note as stated above, a UE includes a radio for communication. As a result, these peripheral communication modules may not all be included. However, in a UE some form of a radio for external communication should be included.

Figure 11:
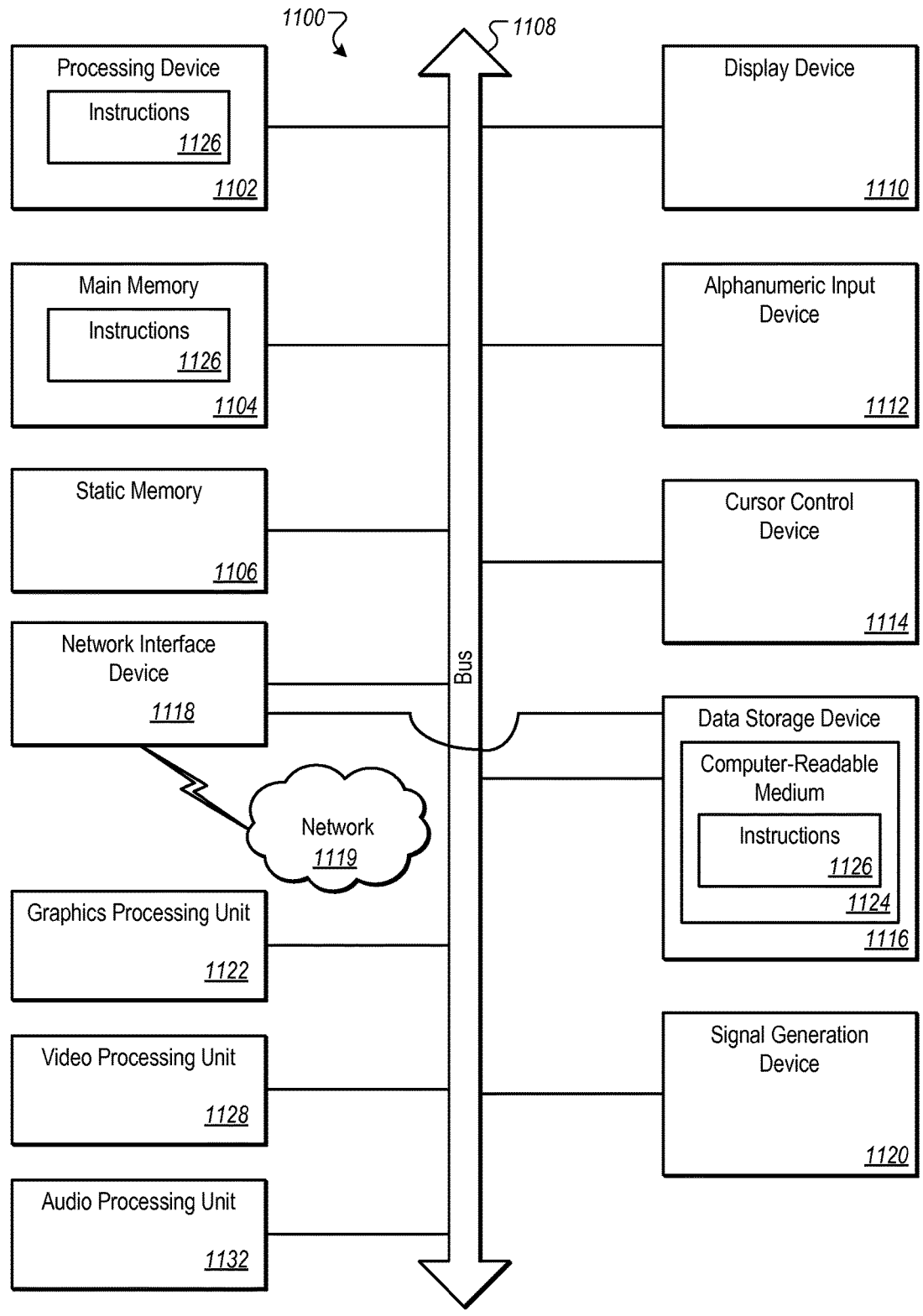
FIG. 11 illustrates another implementation of a block diagram for a computing system.

FIG. 11 illustrates a diagrammatic representation of a machine in the example form of a computing system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments that execute the processor (or SoC) 100 of FIGS. 1-3 may be implemented in the computing system 1100. For example, the computing system 1100 may be a drive array controller 104 or 104A or a networked RAID device that includes the drive array controller 104 or 104A and the RAID system 120.

The computing system 1100 includes a processing device 1102, main memory 1104 (e.g., flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1116, which communicate with each other via a bus 1108. In one embodiment, the data storage device 1116 may be a networked RAID device connected to or through the network interface device 1118, such as discussed earlier.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processor cores. The processing device 1102 is configured to execute the processing logic or instructions 1126 for performing the operations discussed herein.

In one embodiment, processing device 1102 may be the processor (or SoC) 100 of FIG. 1. Alternatively, the computing system 1100 may include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1100 may further include a network interface device 1118 communicably coupled to a network 1119. The computing system 1100 also may include a video display device 1110 (e.g., a liquid crystal display (LCD) or a cathode ray tube (CRT)), an alphanumeric input device 1112 (e.g., a keyboard), a cursor control device 1114 (e.g., a mouse), a signal generation device 1120 (e.g., a speaker), or other peripheral devices. Furthermore, computing system 1100 may include a graphics processing unit 1122, a video processing unit 1128 and an audio processing unit 1132. In another embodiment, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1116 may include a computer-readable storage medium 1124 on which is stored software 1126 embodying any one or more of the methodologies of functions described herein. The software 1126 may also reside, completely or at least partially, within the main memory 1104 as instructions 1126 and/or within the processing device 1102 as processing logic during execution thereof by the computing system 1100; the main memory 1104 and the processing device 1102 also constituting computer-readable storage media.

The computer-readable storage medium 1124 may also be used to store instructions 1126 utilizing the processing device 1102, such as described with respect to FIGS. 1-4, and/or a software library containing methods that call the above applications. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an apparatus comprising: 1) a plurality of drives configured as a redundant array of independent disks (RAID); and 2) drive array controller logic to: a) calculate a first partial parity log (PPL) value for a first write operation that targets a first active stripe of the plurality of drives; b) store the first PPL value in a first pre-allocated portion of the plurality of drives that depends on a first number associated with the first active stripe; c) calculate a second PPL value for a second write operation received by the processor that targets a second active stripe of the plurality of drives; and d) store the second PPL value in a second pre-allocated portion of the plurality of drives that depends on a second number associated with the second active stripe.

In Example 2, the apparatus of Example 1, wherein the drive array controller logic is to calculate and store the first PPL value and the second PPL value at runtime, before issuing target-drive writes and parity-drive writes to the first active stripe and the second active stripe, respectively.

In Example 3, the apparatus of Example 2, wherein, in response to detecting a failed drive event of one of the plurality of drives followed by a power failure event, the drive array controller logic further to restore parity consistency for the first active stripe or the second active stripe using a corresponding PPL value from the first pre-allocated portion or the second pre-allocated portion, respectively.

In Example 4, the apparatus of Example 1, wherein the RAID configuration is a RAID 5 configuration, and wherein the drive array controller logic, to calculate the first PPL value for a read-modify-write operation, is to perform an exclusive OR (XOR) on prior data of active strips and prior parity of the first active stripe.

In Example 5, the apparatus of Example 1, wherein the RAID configuration is a RAID 5 configuration, and wherein the drive array controller logic, to calculate the first PPL value for a read-others write operation, is to perform an XOR on data of non-active strips of the first active stripe.

In Example 6, the apparatus of Examples 1-5, wherein the first pre-allocated portion is located on a first parity drive assigned to the first active stripe, and wherein the second pre-allocated portion is located on a second parity drive assigned to the second active stripe.

In Example 7, the apparatus of Example 6, wherein the first pre-allocated portion is further located on a portion at an end of the first parity drive and the second pre-allocated portion is further located on a portion at an end of the second parity drive.

In Example 8, the apparatus of Example 1, wherein, for a partial-strip write within the first active stripe, the drive array controller logic is further to: a) logically divide the first active stripe into sub-stripes, for which the partial-strip write is a full-strip write for a sub-stripe; b) calculate a PPL sub-value for respective sub-stripes; and c) calculate the first PPL value for the first active stripe as a concatenation of the PPL sub-values.

In Example 9, the apparatus of Example 1-8, wherein the RAID configuration is a RAID 5 configuration or a RAID 6 configuration.

Various embodiments may have different combinations of the structural features described above. For instance, all optional features of the computing system described above may also be implemented with respect to the method or process described herein and specifics in the examples may be used anywhere in one or more embodiments.

Example 10 is a system comprising: 1) a plurality of drives configured as a redundant array of independent disks (RAID); 2) a processor operatively coupled to the plurality of drives, the processor to execute drive array controller logic, and 3) wherein, while the plurality of drives operates without a failed drive, the drive array controller logic to: a) calculate a first partial parity log (PPL) value for a first write operation received by the processor that targets a first active stripe of the plurality of drives; b) store the first PPL value for the first write operation in a strip of the first active stripe; c) calculate a second PPL value for a second write operation received by the processor that targets a second active stripe of the plurality of drives; and d) store the second PPL value for the second write operation in a strip of the second active stripe.

In Example 11, the system of Example 10, wherein the strip in which is stored the first PPL value is not a data strip or a parity strip of the first active stripe, and the strip in which is stored the second PPL value is not a data strip or a parity strip of the second active stripe.

In Example 12, the system of Example 10, wherein the drive array controller logic is further to calculate and store the first PPL value and the second PPL value before issuing target-drive writes and parity-drive writes to the first active stripe and the second active stripe, respectively.

In Example 13, the system of Example 10, wherein the drive array controller logic, to calculate the first PPL value for a read-modify-write operation, is a) to perform an exclusive OR (XOR) on prior data of active strips and prior parity of the first active stripe; and b) to calculate the second PPL value for a read-others write operation, is to perform an XOR on data of non-active strips of the second active stripe.

In Example 14, the system of Example 10, wherein, for a partial-strip write within the first active stripe, the drive array controller logic further to: a) logically divide the first active stripe into sub-stripes, for which the partial-strip write is a full-strip write for a sub-stripe; b) calculate a PPL sub-value for respective sub-stripes; and c) calculate the first PPL value for the first active stripe as a concatenation of the PPL sub-values.

In Example 15, the system of Example 10, wherein, in response to detecting a failed drive event of one of the plurality of drives followed by a power failure event, the drive array controller logic further to restore parity consistency for an active stripe using a corresponding PPL value stored on an active strip of an operational drive of the plurality of drives.

Various embodiments may have different combinations of the structural features described above. For instance, all optional features of the processors and methods described above may also be implemented with respect to a system described herein and specifics in the examples may be used anywhere in one or more embodiments.

In Example 16, a method comprising: 1) calculating, by a processor core executing drive array controller logic, a first partial parity log (PPL) value for a first write operation that targets a first active stripe of a drive in a plurality of drives configured in a redundant array of independent disks (RAID), the plurality of drives operating in a state without any failed drive; 2) storing, by the processor core executing the drive array controller logic, the first PPL value for the first write operation in a first pre-allocated portion of the plurality of drives that depends on a number associated with the first active stripe; 3) calculating, by the processor core executing the drive array controller logic, a second PPL value for a second write operation received by the processor that targets a second active stripe of the plurality of drives; and 4) storing, by the processor core executing the drive array controller logic, the second PPL value in a second pre-allocated portion of the plurality of drives that depends on a number associated with the second active stripe.

In Example 17, the method of Example 16, wherein the calculating and the storing the first PPL value and the second PPL value occur before issuing target-drive writes and parity-drive writes to, respectively, the first active stripe and the second active stripe.

In Example 18, the method of Example 16, further comprising restoring parity consistency for the first active stripe or the second active stripe using, respectively, the first PPL value from the first pre-allocated portion or the second PPL value from the second pre-allocated portion, in response to detecting a failed drive event of one of the plurality of drives followed by a power failure event.

In Example 19, the method of Example 16, further comprising calculating the first PPL value for a read-modify-write operation by performing an exclusive OR (XOR) on prior data of active strips and prior parity of the first active stripe, wherein the RAID configuration comprises a RAID 5 configuration.

In Example 20, the method of Example 16, the method further comprising calculating the first PPL value for a read-others write operation by performing an XOR on data of non-active strips of the first active stripe, wherein the RAID configuration comprises a RAID 5 configuration.

In Example 21, the method of Example 16, wherein storing the first PPL value in the first pre-allocated portion comprises writing the first PPL value to a first parity drive assigned to the first active stripe, and wherein storing the second PPL value in the second pre-allocated portion comprises writing the second PPL value to a second parity drive assigned to the second active stripe.

In Example 22, the method of Example 16, wherein storing the first PPL value in the first pre-allocated portion comprises writing the first PPL value to a portion at an end of a first parity drive assigned to the first active stripe, and wherein storing the second PPL value in the second pre-allocated portion comprises writing the second PPL value to a portion at an end of a second parity drive assigned to the second active stripe.

In Example 23, the method of Example 16, wherein storing the first PPL value in the first pre-allocated portion comprises writing the first PPL value to a strip of the first active stripe other than data strips and a parity strip of the first active stripe, and wherein storing the second PPL value in the second pre-allocated portion comprises writing the second PPL value to a strip of the second active stripe other than data strips and a parity strip of the second active stripe.

In Example 24, the method of Example 16, wherein the calculating the first PPL value further comprises: a) calculating a checksum of the first PPL value; and b) storing the checksum in a header of a PPL container in which is stored the first PPL value.

In Example 25, the method of Examples 16-24, wherein the plurality of drives is configured in a RAID 5 configuration or in a RAID 6 configuration.

Various embodiments may have different combinations of the structural features described above. For instance, all optional features of the processors and methods described above may also be implemented with respect to a system described herein and specifics in the examples may be used anywhere in one or more embodiments.

Example 26 is system comprising: 1) a processor core to control a drive array controller; and 2) wherein the drive array controller to: a) calculate a partial parity log (PPL) value for write operations received by the processor core, wherein the write operations target active stripes of a plurality of drives configured as a redundant array of independent disks (RAID); and b) store the PPL value for respective write operations in a non-volatile journaling drive as related to respective active stripes on the plurality of drives, wherein the non-volatile journaling drive is not one of the series of drives.

In Example 27, the system of Example 26, wherein the drive array controller is to calculate and store the PPL value before issuing target-drive writes and parity-drive writes for the RAID system in normal state.

In Example 28, the system of Example 26, wherein the RAID system comprises a RAID 5 array, and wherein the drive array controller, to calculate the PPL value for a read-others write operation, is to perform an XOR on data of non-active strips of the active stripes.

In Example 29, the system of Examples 26-28, wherein the series of drives are arranged in a RAID 5 or a RAID 6 configuration.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, operation and the like in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to efficient and cost-effective solutions to a redundant array of independent disks (RAID) write hole in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor or SoC, other embodiments are applicable to other types of integrated circuits and logic devices, including a drive array controller and a RAID device. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EE-PROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus comprising:
   a plurality of drives configured in a redundant array of independent disks (RAID) configuration; and
   a drive array controller circuit to:
      calculate a first partial parity log (PPL) value for a first write operation that targets a first active stripe of the plurality of drives, wherein the first PPL value is a first intermediate parity value useable to generate a first new parity value if the first new parity value is incorrect due to a power failure event, and wherein the first new parity value is stored in a first parity drive of the plurality of drives assigned to the first active stripe;
      store the first PPL value in a first pre-allocated portion of the plurality of drives that depends on a first number associated with the first active stripe;
      calculate a second PPL value for a second write operation that targets a second active stripe of the plurality of drives, wherein the second PPL value is a second intermediate parity value useable to generate a second new parity value if the second new parity value is incorrect due a to the power failure event, and wherein the second new parity value is stored in a second parity drive of the plurality of drives assigned to the second active stripe; and
      store the second PPL value in a second pre-allocated portion of the plurality of drives that depends on a second number associated with the second active stripe.

2. The apparatus of claim 1, wherein the drive array controller circuit is to calculate and store the first PPL value and the second PPL value at runtime, before issuing target-drive writes and parity-drive writes to the first active stripe and the second active stripe, respectively.

3. The apparatus of claim 1, wherein, in response to detecting a failed drive event of one of the plurality of drives followed by the power failure event, the drive array controller circuit further to restore parity consistency for the first active stripe or the second active stripe using a corresponding PPL value from the first pre-allocated portion or the second pre-allocated portion, respectively.

4. The apparatus of claim 1, wherein the RAID configuration is a RAID 5 configuration, and wherein the drive array controller circuit, to calculate the first PPL value for a read-modify-write operation, is to perform an exclusive OR (XOR) on prior data of active strips and prior parity of the first active stripe.

5. The apparatus of claim 1, wherein the RAID configuration is a RAID 5 configuration, and wherein the drive array controller circuit, to calculate the first PPL value for a read-others write operation, is to perform an XOR on data of non-active strips of the first active stripe.

6. The apparatus of claim 1, wherein the first pre-allocated portion is located on the first parity drive assigned to the first active stripe, and wherein the second pre-allocated portion is located on the second parity drive assigned to the second active stripe.

7. The apparatus of claim 6, wherein the first pre-allocated portion is further located on a portion at an end of the first parity drive and the second pre-allocated portion is further located on a portion at an end of the second parity drive.

8. The apparatus of claim 1, wherein, for a partial-strip write within the first active stripe, the drive array controller circuit is further to:
   logically divide the first active stripe into sub-stripes, for which the partial-strip write is a full-strip write for a sub-stripe;
   calculate a PPL sub-value for respective sub-stripes; and
   calculate the first PPL value for the first active stripe as a concatenation of the PPL sub-values.

9. The apparatus of claim 1, wherein the RAID configuration is one of a RAID 5 configuration or a RAID 6 configuration.

10. A system comprising:
    a plurality of drives configured as a redundant array of independent disks (RAID);
    a processor operatively coupled to the plurality of drives, the processor to execute drive array controller logic to:
       calculate a first partial parity log (PPL) value for a first write operation received by the processor that targets a first active stripe of the plurality of drives wherein the first PPL value is a first intermediate parity value useable to generate a first new parity value if the first new parity value is incorrect due to a power failure event, and wherein the first new parity value is stored in a first parity drive of the plurality of drives assigned to the first active stripe;
       store the first PPL value for the first write operation in a first strip of the first active stripe;
       calculate a second PPL value for a second write operation received by the processor that targets a second active stripe of the plurality of drives, wherein the second PPL value is a second intermediate parity value useable to generate a second new parity value if the second new parity value is incorrect due a to the power failure event, and wherein the second new parity value is stored in a second parity drive of the plurality of drives assigned to the second active stripe; and store the second PPL value for the second write operation in a second strip of the second active stripe.

11. The system of claim 10, wherein the first strip in which is stored the first PPL value is not a data strip or a parity strip of the first active stripe, and the second strip in which is stored the second PPL value is not a data strip or a parity strip of the second active stripe.

12. The system of claim 10, wherein the processor is further to calculate and store the first PPL value and the second PPL value before issuing target-drive writes and parity-drive writes to the first active stripe and the second active stripe, respectively.

13. The system of claim 10, wherein the processor, to calculate the first PPL value for a read-modify-write operation, is to perform an exclusive OR (XOR) on prior data of active strips and prior parity of the first active stripe; and to calculate the second PPL value for a read-others write operation, is to perform an XOR on data of non-active strips of the second active stripe.

14. The system of claim 10, wherein, for a partial-strip write within the first active stripe, the processor further to:
logically divide the first active stripe into sub-stripes, for which the partial-strip write is a full-strip write for a sub-stripe;
calculate a PPL sub-value for respective sub-stripes; and
calculate the first PPL value for the first active stripe as a concatenation of the PPL sub-values.

15. The system of claim 10, wherein, in response to detecting a failed drive event of one of the plurality of drives followed by the power failure event, the processor further to restore parity consistency for an active stripe using a corresponding PPL value stored on an active strip of an operational drive of the plurality of drives.

16. A method comprising:
calculating, by a processor core executing drive array controller logic, a first partial parity log (PPL) value for a first write operation that targets a first active stripe of a drive in a plurality of drives arranged in a redundant array of independent disks (RAID) configuration, the plurality of drives operating in a state without any failed drive, wherein the first PPL value is a first intermediate parity value useable to generate a first new parity value if the first new parity value is incorrect due to a power failure event;
storing the first new parity value in a first parity drive of the plurality of drives assigned to the first active stripe;
storing, by the processor core executing the drive array controller logic, the first PPL value for the first write operation in a first pre-allocated portion of the plurality of drives that depends on a first number associated with the first active stripe;
calculating, by the processor core executing the drive array controller logic, a second PPL value for a second write operation received by the processor that targets a second active stripe of the plurality of drives, wherein the second PPL value is a second intermediate parity value useable to generate a second new parity value if the second new parity value is incorrect due a to the power failure event;
storing the second new parity value in a second parity drive of the plurality of drives assigned to the second active stripe; and
storing, by the processor core executing the drive array controller logic, the second PPL value in a second pre-allocated portion of the plurality of drives that depends on a second number associated with the second active stripe.

17. The method of claim 16, wherein the calculating and the storing the first PPL value and the second PPL value occur before issuing target-drive writes and parity-drive writes to, respectively, the first active stripe and the second active stripe.

18. The method of claim 16, further comprising restoring parity consistency for the first active stripe or the second active stripe using, respectively, the first PPL value from the first pre-allocated portion or the second PPL value from the second pre-allocated portion, in response to detecting a failed drive event of one of the plurality of drives followed by the power failure event.

19. The method of claim 16, further comprising calculating the first PPL value for a read-modify-write operation by performing an exclusive OR (XOR) on prior data of active strips and prior parity of the first active stripe, wherein the RAID configuration comprises a RAID 5 configuration.

20. The method of claim 16, the method further comprising calculating the first PPL value for a read-others write operation by performing an XOR on data of non-active strips of the first active stripe, wherein the RAID configuration comprises a RAID 5 configuration.

21. The method of claim 16, wherein storing the first PPL value in the first pre-allocated portion comprises writing the first PPL value to the first parity drive assigned to the first active stripe, and wherein storing the second PPL value in the second pre-allocated portion comprises writing the second PPL value to the second parity drive assigned to the second active stripe.

22. The method of claim 16, wherein storing the first PPL value in the first pre-allocated portion comprises writing the first PPL value to a portion at an end of a first parity drive assigned to the first active stripe, and wherein storing the second PPL value in the second pre-allocated portion comprises writing the second PPL value to a portion at an end of a second parity drive assigned to the second active stripe.

23. The method of claim 16, wherein storing the first PPL value in the first pre-allocated portion comprises writing the first PPL value to a strip of the first active stripe other than data strips and a parity strip of the first active stripe, and wherein storing the second PPL value in the second pre-allocated portion comprises writing the second PPL value to a strip of the second active stripe other than data strips and a parity strip of the second active stripe.

24. The method of claim 16, wherein the calculating the first PPL value further comprises:
calculating a checksum of the first PPL value; and
storing the checksum in a header of a PPL container in which is stored the first PPL value.

25. The method of claim 16, wherein the plurality of drives is configured in one of a RAID 5 configuration or in a RAID 6 configuration.

* * * * *